US010397277B2

(12) United States Patent
Kamble

(10) Patent No.: US 10,397,277 B2
(45) Date of Patent: Aug. 27, 2019

(54) DYNAMIC DATA SOCKET DESCRIPTOR MIRRORING MECHANISM AND USE FOR SECURITY ANALYTICS

(71) Applicant: Avocado Systems Inc., San Jose, CA (US)

(72) Inventor: Keshav Govind Kamble, San Jose, CA (US)

(73) Assignee: AVOCADO SYSTEMS INC., San Jose, CA (US)

( * ) Notice: Subject to any disclaimer, the term of this patent is extended or adjusted under 35 U.S.C. 154(b) by 232 days.

(21) Appl. No.: 15/182,548

(22) Filed: Jun. 14, 2016

(65) Prior Publication Data

US 2016/0366187 A1  Dec. 15, 2016

Related U.S. Application Data

(60) Provisional application No. 62/175,401, filed on Jun. 14, 2015.

(51) Int. Cl.
*H04L 29/06* (2006.01)
*G06F 3/06* (2006.01)

(52) U.S. Cl.
CPC .............. *H04L 63/20* (2013.01); *G06F 3/065* (2013.01); *G06F 3/067* (2013.01); *G06F 3/0619* (2013.01); *G06F 3/06* (2013.01); *G06F 3/0614* (2013.01); *H04L 63/0245* (2013.01); *H04L 63/10* (2013.01); *H04L 63/108* (2013.01); *H04L 63/12* (2013.01)

(58) Field of Classification Search
CPC ....... H04L 63/20; H04L 63/10; H04L 63/108; H04L 29/06; H04L 63/0245; G06F 3/0619; G06F 3/06; G06F 3/0614; G06F 3/065
See application file for complete search history.

(56) References Cited

U.S. PATENT DOCUMENTS

| | | |
|---|---|---|
| 6,694,434 B1 | 2/2004 | McGee et al. |
| 7,530,072 B1 | 5/2009 | Cheaz |
| 7,788,480 B2 | 8/2010 | Winget et al. |
| 7,895,642 B1 | 2/2011 | Larson et al. |
| 8,776,168 B1 | 7/2014 | Gibson et al. |

(Continued)

OTHER PUBLICATIONS

Kamble, K., U.S. Appl. No. 15/181,275, filed Jun. 13, 2016.
(Continued)

*Primary Examiner* — Jayesh M Jhaveri
(74) *Attorney, Agent, or Firm* — Zilka-Kotab, P.C.

(57) ABSTRACT

According to another embodiment, a system includes a processing circuit and logic integrated with and/or executable by the processing circuit. The logic is configured to cause the processing circuit to receive, at a first host on which an application instance is operating, an application or data security policy for a first data socket descriptor indicating to perform one or more actions including to mirror one or more payloads received or transmitted by the first data socket descriptor of the application instance. The logic is also configured to cause the processing circuit to perform, by the first host, at least one action selected from a group of actions in response to the indication by the application and data security policy to perform the one or more actions, the group of actions including allow-and-analyze, drop-and-analyze, and mirror.

18 Claims, 10 Drawing Sheets

(56) References Cited

U.S. PATENT DOCUMENTS

| | | | |
|---|---|---|---|
| 9,077,617 B1* | 7/2015 | Seth | H04L 41/0668 |
| 9,094,407 B1 | 7/2015 | Matthieu et al. | |
| 9,338,181 B1 | 5/2016 | Burns et al. | |
| 9,349,015 B1 | 5/2016 | Archer et al. | |
| 9,491,107 B1* | 11/2016 | Scudder | H04L 47/30 |
| 9,652,618 B1 | 5/2017 | Lerner | |
| 9,742,768 B2 | 8/2017 | Cholas et al. | |
| 9,952,790 B2 | 4/2018 | Kamble | |
| 9,954,578 B2 | 4/2018 | Ehrensvard | |
| 10,049,211 B1 | 8/2018 | Lukacs et al. | |
| 10,129,220 B2 | 11/2018 | Kamble | |
| 10,148,697 B2 | 12/2018 | Kamble | |
| 10,193,889 B2 | 1/2019 | Kamble | |
| 10,193,930 B2 | 1/2019 | Kamble | |
| 10,270,810 B2 | 4/2019 | Kamble | |
| 10,354,070 B2 | 7/2019 | Kamble | |
| 10,356,068 B2 | 7/2019 | Kamble | |
| 2003/0118185 A1 | 6/2003 | Lambert | |
| 2003/0140089 A1 | 7/2003 | Hines et al. | |
| 2004/0010612 A1* | 1/2004 | Pandya | H04L 29/06 709/230 |
| 2004/0034767 A1 | 2/2004 | Robinson et al. | |
| 2006/0020814 A1 | 1/2006 | Lieblich et al. | |
| 2006/0069912 A1 | 3/2006 | Zheng et al. | |
| 2007/0028090 A1 | 2/2007 | Lopez et al. | |
| 2007/0033642 A1 | 2/2007 | Ganesan et al. | |
| 2007/0129015 A1 | 6/2007 | Iwamoto et al. | |
| 2007/0239761 A1 | 10/2007 | Baio et al. | |
| 2007/0250923 A1 | 10/2007 | M'Raihi | |
| 2008/0115203 A1 | 5/2008 | Elzur | |
| 2008/0201772 A1* | 8/2008 | Mondaeev | H04L 63/1408 726/13 |
| 2009/0019535 A1 | 1/2009 | Mishra et al. | |
| 2009/0172402 A1 | 7/2009 | Tran | |
| 2009/0185687 A1 | 7/2009 | Wankmueller et al. | |
| 2009/0228970 A1* | 9/2009 | Morimoto | H04L 63/10 726/12 |
| 2009/0328194 A1 | 12/2009 | Kim et al. | |
| 2010/0037295 A1 | 2/2010 | Oh et al. | |
| 2010/0228964 A1 | 9/2010 | Booth | |
| 2010/0275026 A1 | 10/2010 | McLean | |
| 2011/0173699 A1 | 7/2011 | Figlin et al. | |
| 2011/0214157 A1* | 9/2011 | Korsunsky | G06F 21/55 726/1 |
| 2011/0302624 A1 | 12/2011 | Chen et al. | |
| 2011/0321172 A1 | 12/2011 | Maeda et al. | |
| 2012/0051314 A1 | 3/2012 | Goyal et al. | |
| 2012/0096510 A1 | 4/2012 | Bentall | |
| 2012/0173875 A1 | 7/2012 | Mahidhara et al. | |
| 2012/0311614 A1 | 12/2012 | Deanna et al. | |
| 2013/0179061 A1 | 7/2013 | Gadh et al. | |
| 2013/0191905 A1 | 7/2013 | Harada et al. | |
| 2014/0036662 A1 | 2/2014 | Takeshima et al. | |
| 2014/0051432 A1 | 2/2014 | Gupta et al. | |
| 2014/0237545 A1 | 8/2014 | Mylavarapu et al. | |
| 2014/0317738 A1* | 10/2014 | Be'ery | H04L 63/14 726/23 |
| 2014/0380484 A1 | 12/2014 | Choi et al. | |
| 2015/0134965 A1 | 5/2015 | Morenius et al. | |
| 2015/0172153 A1 | 6/2015 | Sharma et al. | |
| 2015/0213237 A1 | 7/2015 | Kruglick | |
| 2016/0080399 A1 | 3/2016 | Harris et al. | |
| 2016/0191530 A1* | 6/2016 | Jain | H04L 63/101 726/4 |
| 2016/0308904 A1 | 10/2016 | Yoon et al. | |
| 2016/0321452 A1 | 11/2016 | Richardson et al. | |
| 2016/0364163 A1 | 12/2016 | Kamble | |
| 2016/0366108 A1 | 12/2016 | Kamble | |
| 2016/0366142 A1 | 12/2016 | Kamble | |
| 2016/0366186 A1 | 12/2016 | Kamble | |
| 2016/0373485 A1 | 12/2016 | Kamble | |
| 2016/0381076 A1 | 12/2016 | Kamble et al. | |
| 2017/0006065 A1 | 1/2017 | Kamble et al. | |
| 2017/0019388 A1 | 1/2017 | Kamble et al. | |
| 2017/0039371 A1 | 2/2017 | Lukacs et al. | |
| 2017/0053120 A1 | 2/2017 | Kamble et al. | |
| 2017/0230414 A1 | 8/2017 | Kamble | |
| 2018/0069862 A1 | 3/2018 | Cholas et al. | |
| 2018/0089429 A1 | 3/2018 | Kamble | |

OTHER PUBLICATIONS

Non-Final Office Action from U.S. Appl. No. 15/181,275, dated Dec. 8, 2017.
Younis, A., "Socket Data structures and How the TCP protocol works," CS457, Fall 2014, pp. 1-18 retrieved from http://www.cs.colostate.edu/-gersch/cs457/CS457 tutorial2.pdf.
Hall, B., "Beej's Guide to Network Programming Using Internet Sockets," May 3, 2001, pp. 1-47 retrieved from http://www.cs.columbia.edu/-danr/courses/6761 /Fall00/hw/pa1 /6761-sockhelp.pdf.
Kamble, K., U.S. Appl. No. 15/181,304, filed Jun. 13, 2016.
Notice of Allowance from U.S. Appl. No. 15/181,304, dated Dec. 15, 2017.
Kamble, K., U.S. Appl. No. 15/182,505, filed Jun. 14, 2016.
Non-Final Office Action from U.S. Appl. No. 15/182,505, dated Apr. 6, 2018.
Kamble, K., U.S. Appl. No. 15/182,544, filed Jun. 14, 2016.
Non-Final Office Action from U.S. Appl. No. 15/182,544, dated Mar. 16, 2018.
Kamble, K., U.S. Appl. No. 15/184,956, filed Jun. 16, 2016.
Non-Final Office Action from U.S. Appl. No. 15/184,956, dated Mar. 30, 2018.
Kamble et al., U.S. Appl. No. 15/191,420, filed Jun. 23, 2016.
Non-Final Office Action from U.S. Appl. No. 15/191,420, dated Mar. 22, 2018.
Kamble et al., U.S. Appl. No. 15/197,635, filed Jun. 29, 2016.
Non-Final Office Action from U.S. Appl. No. 15/197,635, dated May 11, 2018.
Kamble et al., U.S. Appl. No. 15/210,828, filed Jul. 14, 2016.
Non-Final Office Action from U.S. Appl. No. 15/210,828, dated Jun. 13, 2018.
Kamble et al., U.S. Appl. No. 15/243,854, filed Aug. 22, 2016.
Kamble, K., U.S. Appl. No. 15/275,239, filed Sep. 23, 2016.
Non-Final Office Action from U.S. Appl. No. 15/275,239, dated May 16, 2018.
Kamble, K., U.S. Appl. No. 15/424,749, filed Feb. 3, 2017.
Notice of Allowance from U.S. Appl. No. 15/181,275, dated Jul. 16, 2018.
Du, W., "Syn-Cookies Exploration Lab," Syracuse University, 2006, pp. 1-3.
Final Office Action from U.S. Appl. No. 15/191,420, dated Aug. 14, 2018.
Supplemental Notice of Allowance from U.S. Appl. No. 15/181,275, dated Sep. 6, 2018.
Notice of Allowance from U.S. Appl. No. 15/184,956, dated Sep. 4, 2018.
Non-Final Office Action from U.S. Appl. No. 15/424,749, dated Sep. 19, 2018.
Kar et al., "Prevention of SQL Injection Attack Using Query Transformation and Hashing," 3rd Annual IEEE International Advance Computing Conference, 2013, pp. 1317-1323.
Notice of Allowance from U.S. Appl. No. 15/182,544, dated Oct. 4, 2018.
Non-Final Office Action from U.S. Appl. No. 15/243,854, dated Oct. 5, 2018.
Supplemental Notice of Allowance from U.S. Appl. No. 15/181,275, dated Oct. 17, 2018.
Corrected Notice of Allowance from U.S. Appl. No. 15/184,956, dated Oct. 29, 2018.
Notice of Allowance from U.S. Appl. No. 15/197,635, dated Nov. 14, 2018.
Notice of Allowance from U.S. Appl. No. 15/182,505, dated Dec. 3, 2018.
Corrected Notice of Allowance from U.S. Appl. No. 15/197,635, dated Dec. 10, 2018.

(56) References Cited

OTHER PUBLICATIONS

Final Office Action from U.S. Appl. No. 15/275,239, dated Jan. 18, 2019.
Notice of Allowance from U.S. Appl. No. 15/210,828, dated Mar. 13, 2019.
Notice of Allowance from U.S. Appl. No. 15/243,854, dated Mar. 20, 2019.

* cited by examiner

| 602 | 604 | 606 | 608 | 610 | 612 | 614 | 616 | 618 | 620 | 622 | 624 |
|---|---|---|---|---|---|---|---|---|---|---|---|
| Policy Name | Source IP | Dest IP (Optional) | Server Port | ID1 | ID2 | Base Signature | MTU | App. Buffer Size | Action | Sub-Action | Server Group |

FIG. 6

| 602 | 604 | 606 | 608 | 610 | 612 | 614 | 616 | 618 | 620 | 622 | 624 |
|---|---|---|---|---|---|---|---|---|---|---|---|
| Policy Name | Source IP | Dest IP (Optional) | Server Port | ID1 (OP) | ID2 (OP) | Base Signature (OP) | MTU | App. Buffer Size | Action | Sub-Action | Server Group |

FIG. 7

DYNAMIC DATA SOCKET DESCRIPTOR MIRRORING MECHANISM AND USE FOR SECURITY ANALYTICS

FIELD OF THE INVENTION

The present invention relates to network and system protection, and more particularly, this invention relates to a dynamic mirroring mechanism based on data socket descriptors and use thereof for security analytics.

BACKGROUND

Some conventional switches provide a feature for flow-based mirroring where a network administrator may enable a mirroring mechanism based on switch ports. For the purpose of debugging protocol interactions and understanding traffic patterns, mirroring is widely used. In some cases, by mirroring or replicating flows, effective problem replication may be performed for problem investigations. Here, problems may be of various natures. However, an application has no control over the mirroring functionality for its own flows in and out of a server. Secondly, today's mirroring mechanisms cause a performance impact on all other applications and application flows. Currently, there is no intelligence available to mirror packets based on application states without impacting other applications or application flows.

Applications are made up of a large number of instructions and data. Instructions operate on data which is fetched in a cache and memory and is always unencrypted. Scaled-out, distributed applications are made up of a large number of application instances. These application instances have their own data in the cache and memory of the processor on which these applications run. A large number of such application instances communicate with each other and process data in parallel to create an aggregate output.

These types of scaled-out applications are extremely vulnerable to application breaches, data thefts from cache and memory by scraping, and other methods of illicitly obtaining data from the applications, cache, and/or memory. Therefore, mirroring may be a useful mechanism for identifying possible threats, but not with the limitations of current mirroring mechanisms.

SUMMARY

In one embodiment, a method includes receiving, at a first host on which an application instance is operating, an application or data security policy for a first data socket descriptor indicating to perform one or more actions including to mirror one or more payloads received or transmitted by the first data socket descriptor of the application instance. The method also includes performing, by the first host, at least one action selected from a group of actions in response to the indication by the application and data security policy to perform the one or more actions. The group of actions includes allow-and-analyze, drop-and-analyze, and mirror.

According to another embodiment, a system includes a processing circuit and logic integrated with and/or executable by the processing circuit. The logic is configured to cause the processing circuit to receive, at a first host on which an application instance is operating, an application or data security policy for a first data socket descriptor indicating to perform one or more actions including to mirror one or more payloads received or transmitted by the first data socket descriptor of the application instance. The logic is also configured to cause the processing circuit to perform, by the first host, at least one action selected from a group of actions in response to the indication by the application and data security policy to perform the one or more actions, the group of actions including allow-and-analyze, drop-and-analyze, and mirror.

In yet another embodiment, a computer program product includes a computer readable storage medium having program instructions stored thereon. The program instructions are executable by a processing circuit to cause the processing circuit to receive, at a first host on which an application instance is operating, an application or data security policy for a first data socket descriptor indicating to perform one or more actions including to mirror one or more payloads received or transmitted by the first data socket descriptor of the application instance. The program instructions also cause the processing circuit to perform, by the first host, at least one action selected from a group of actions in response to the indication by the application and data security policy to perform the one or more actions, the group of actions including allow-and-analyze, drop-and-analyze, and mirror.

The embodiments described above may be implemented in any computing system environment known in the art, such as a networking environment, which may include a processor and a computer readable storage medium configured to store data and logic, the logic being implemented with and/or executable by the processor to cause the processor to perform one or more functions.

BRIEF DESCRIPTION OF THE DRAWINGS

The following descriptions of the drawings are not meant to be limiting on what is taught by the drawings in any manner. For a fuller understanding of the content of each drawing, the following brief descriptions are provided, which when read in conjunction with the detailed description, describe the full breadth of the various embodiments of the present invention.

FIG. 6 shows an East-West policy mapping, according to one embodiment.

FIG. 7 shows a North-South profile policy mapping, according to one embodiment.

DETAILED DESCRIPTION

Figure 1:
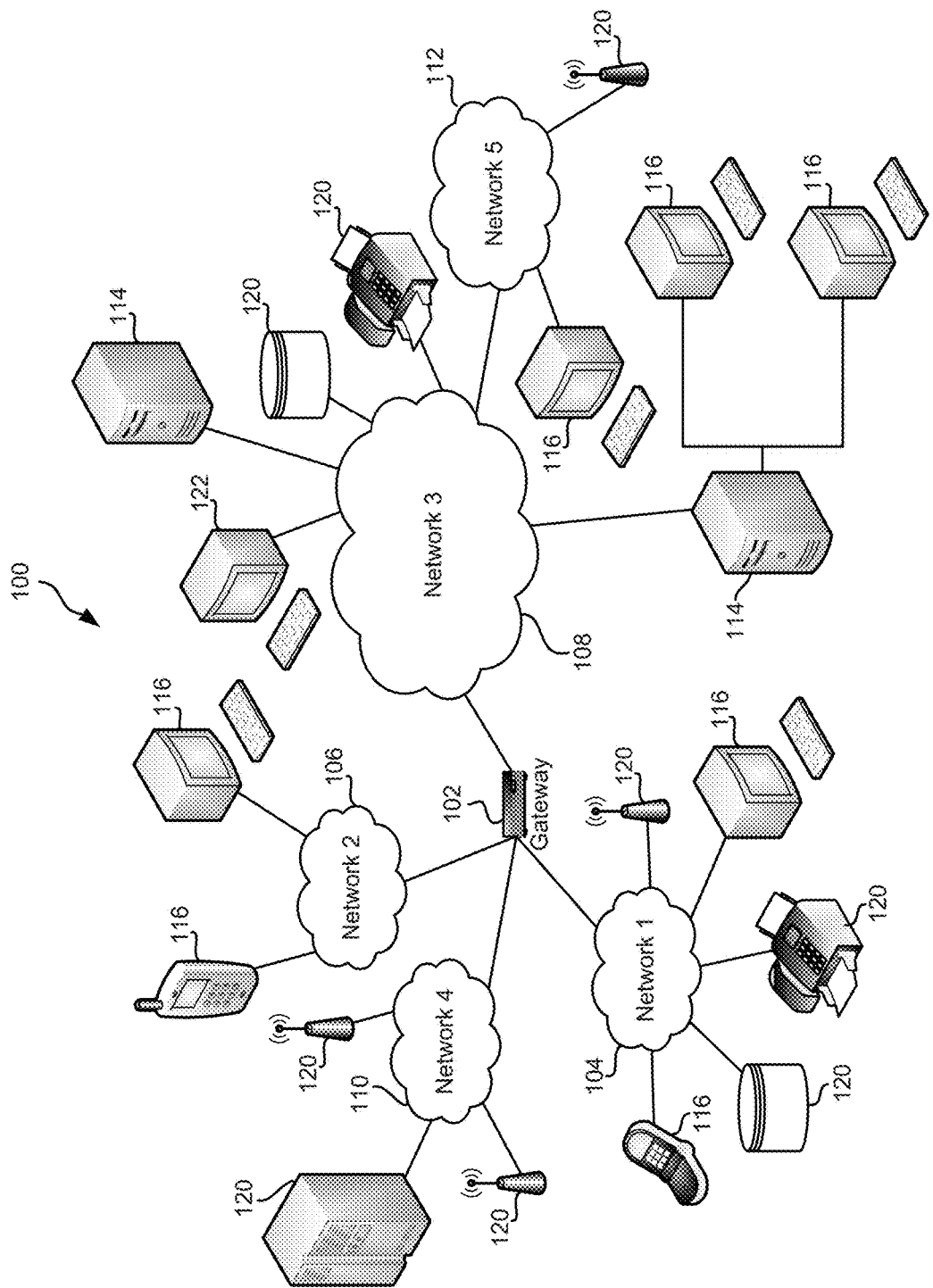
FIG. 1 shows a network architecture, according to one embodiment.

The descriptions presented herein are intended to enable any person skilled in the art to make and use the present invention and are provided in the context and requirements of particular applications of the present invention.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," arid "the" include plural referents unless otherwise specified.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms.

Also, the term "comprise" indicates an inclusive list of those elements specifically described without exclusion of any other elements. For example, "a list comprises red and green" indicates that the list includes, but is not limited to, red and green. Therefore, the list may also include other colors not specifically described.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown and described herein, but is to De accorded the widest scope consistent with the principles and features disclosed herein.

In particular, various embodiments of the invention discussed herein may be implemented using a network, such as the Internet, to communicate among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN), or other communication media. In addition, various combinations of wired (e.g., Ethernet), wireless (e.g., radio frequency) and optical communication links (e.g., fiber optic) may be utilized.

The term application as used herein refers to any type of software and/or hardware-based application, such as enterprise data center applications, Internet-of-Things (IOT) applications, Industrial control applications, military applications, etc.

Enterprise data center applications may include any of the following application types: financial applications, equity trading applications, healthcare applications, financial transaction applications, etc.

IOT applications may include any of the following application types: mobile communication applications, home automation/control applications, industrial automation/control applications, security and monitoring applications, etc.

Industrial control applications may include any of the following application types: nuclear power plant control, thermal power plant control, hydro-electric power plant control, wind farm control, electricity grid and distribution control, water treatment control, land-based traffic control, air traffic control, etc.

Military applications may include any of the following application types: military installation control, first alert system control, autoguided weapon system control, military weaponized equipment control including manned vehicles, weaponized and/or surveillance-oriented unmanned vehicle control (drones) such as unmanned aerial vehicles (UAVs), unmanned aircraft systems (UASs), unmanned underwater vehicles (UUVs), unmanned ground vehicles (UGVs), etc.

A program environment in which one embodiment may be executed illustratively incorporates one or more general-purpose computers and/or special-purpose devices, such as switches, routers, switch controllers, etc. Details of such devices (e.g., processor, memory, data storage, input devices, and output devices) are well known and are omitted for the sake of clarity.

It should also be understood that the techniques of the present invention may be implemented using a variety of technologies. For example, the methods described herein may be implemented in software running on a computer system, implemented in hardware utilizing one or more hardware processors and logic (hardware logic and/or software logic) implemented with and/or executable by the hardware processor. The logic is configured to cause the processor to perform operations of a method, and may take any form known to those of skill in the art, such as application specific integrated circuits (ASICs), programmable logic devices such as Field Programmable Gate Arrays (FPGAs), and/or various combinations thereof.

In one illustrative approach, methods described herein may be implemented by a series of computer-executable instructions stored to a computer readable storage medium, such as a physical (e.g., non-transitory) data storage medium. In addition, although specific embodiments may employ object-oriented software programming concepts, the present invention is not so limited and is adaptable to employ other forms of directing the operation of a processor.

The present invention may also be provided in the form of a computer program product comprising a computer readable storage medium having program instructions thereon or a computer readable signal medium having program instructions therein, which may be executed by a computing device (e.g., a processor) and/or a system. A computer readable storage medium may include any medium capable of storing program instructions thereon for use by a computing device or system, including optical media such as read only and writeable CDs and DVDs, magnetic memory or media (e.g., hard disk drive, magnetic tape, etc.), semiconductor memory (e.g., FLASH memory, non-volatile random access memory (NVRAM), and other non-volatile storage media known in the art), firmware encoded in a microprocessor, etc.

A computer readable signal medium is one that does not fit within the aforementioned computer readable storage medium definitions. For example, illustrative computer readable signal media communicate or otherwise transfer transitory signals within a system, between systems, etc., e.g., via a physical or virtual network having a plurally of connections.

FIG. 1 illustrates an architecture 100, in accordance with one embodiment. As an option, the present architecture 100 may be implemented in conjunction with features from any other embodiment listed herein, such as those described with reference to the other figures. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks are provided including a first remote network 104 and a second remote network 106. A gateway 102 may be coupled between the remote networks 104, 106 arid a proximate network 108. In the context of the present network architecture 100, the networks 104, 106 may each take any form including, but riot limited to, a LAN, a WAN such as the Internet, a storage area network (SAN), a public switched telephone network (PSTN), an internal telephone network, etc. Additional networks 110, 112 may also be connected via the gateway 102 or some other connection device known in the art. These networks may be of a different type than the networks 104, 106. For example, network no may be a network devoted to the IOT, and may provide infrastructure and protocols for communication between all devices in the IOT, and between any devices in the IOT and the networks 104,106. In another example, network 112 may be a network devoted to Industrial control, and may provide infrastructure and protocols for communication within and/or between facilities anywhere in the world, including automated devices, manufacturing lines, assembly lines, processing control software, etc.

In use, the gateway 102 serves as an entrance point from the remote networks 104, 106 to the proximate network 108. As such, the gateway 102 may function as a router, which is capable of directing a given packet of data that arrives at the gateway 102, and a switch, which furnishes the actual path in and out of the gateway 102 for a given packet.

Further included in the network architecture too is at least one data server 114 coupled to the proximate network 108, and which is accessible from the remote networks 104, 106 via the gateway 102. It should be noted that the data server(s) 114 may include any type of computing device/ groupware. Coupled to each data server 114 is a plurality of user devices 116. User devices 116 may include any device known by those of skill in the art, such as a desktop computer, a laptop computer, a hand-held computer, a smartphone, a terminal, a port, a printer, some type or form of logic, etc. It should be noted that a user device 122 may also be directly coupled to any of the networks, in one embodiment.

A peripheral 120 or series of peripherals 120, e.g., facsimile machines, printers, networked storage units, hard disk drives, wireless routers, etc., may be coupled to one or more of the networks 104, 106, 108, 110, 112. It should be noted that databases, servers, mainframes, and/or additional components may be utilized with and/or integrated into any type of network element coupled to the networks 104, 106, 108, 110, 112. In the context of the present descriptions, a network element may refer to any component of a network, system,device, and/or any device useable in a network.

According to some approaches, methods arid systems described herein may be implemented with and/or utilized on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of virtualization software, such as VMWARE ESX, MICROSOFT HYPER-V, SIMICS, etc., in some embodiments.

In more approaches, one or more of the networks 104, 106, 108, 110, 112 may represent a cluster of systems commonly referred to as a "cloud." In cloud computing, shared resources, such as processing power, peripherals, software, data processing, servers, storage, etc., are provided to any system that has access to the cloud and permission to access the specific resource, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used as would be understood by those of skill in the art.

Figure 2:
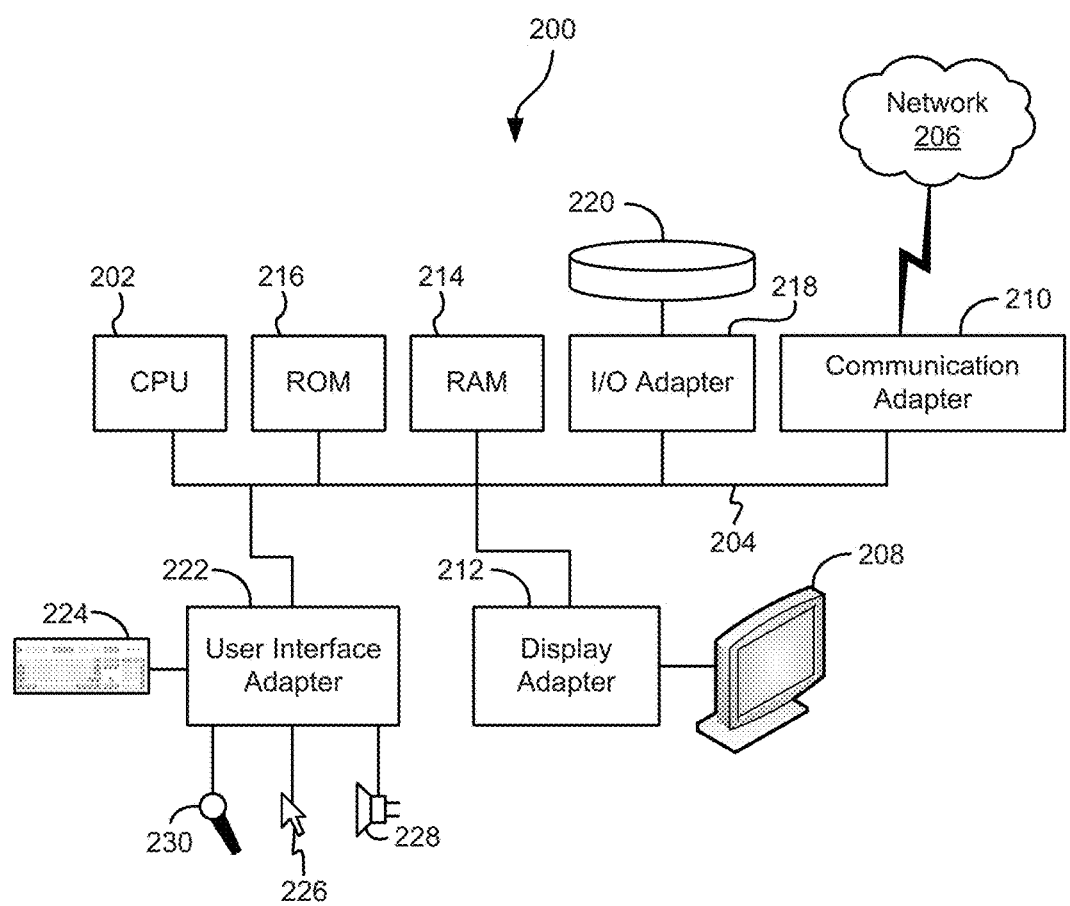
FIG. 2 shows a hardware environment that may be associated with the network architecture of FIG. 1, according to one embodiment.

FIG. 2 shows a representative hardware environment associated with a user device 116 and/or a server 114 of FIG. 1, in accordance with one embodiment. FIG. 2 illustrates a typical hardware configuration of a workstation 200 having a central processing unit 202, such as a microprocessor, and a number of other units interconnected via a system bus 204.

The workstation 200 shown in FIG. 2 includes a Random Access Memory (RAM) 214, Read Only Memory (RUM) 216, an I/O adapter 218 configured to connect peripheral devices, such as disk storage units 220 to the bus 204, a user interface adapter 222 configured to connect a keyboard 224, a mouse 226, a speaker 228, a microphone 230, and/or other user interface devices such as a touch screen, a digital camera, etc., (riot shown) to the bus 204, communication adapter 210 configured to connect the workstation 200 to a communication network 206 (e.g., a data processing network) and a display adapter 212 configured to connect the bus 204 to a display device 208.

The workstation 200 may have resident thereon an operating system, such as the MICROSOFT WINDOWS Operating System (OS), a MAC OS, a UNIX OS, etc. It will be appreciated that a preferred embodiment may also be implemented on platforms and operating systems other than those specifically mentioned herein. A preferred embodiment may be written using JAVA, XML, C, and/or C++ language, SCALA, COBOL, FORTRAN, or other programming languages, along with an object oriented programming methodology or scripting language such as PERL, PYTHON, Tcl/Tk, or other scripting languages. Object oriented programming (OOP), which has become increasingly used to develop complex applications, may also be used.

Moreover, one or more hardware processors may be implemented in a processing circuit in the workstation 200. The processing circuit includes the one or more hardware processors, along with any connections or links therebetween necessary to interconnect the one or more processors in the processing circuit. In addition, the processing circuit may be implemented with logic and/or may be configured to execute logic, with the logic being configured to cause the processing circuit to perform functionality specified by the logic.

Figure 3:
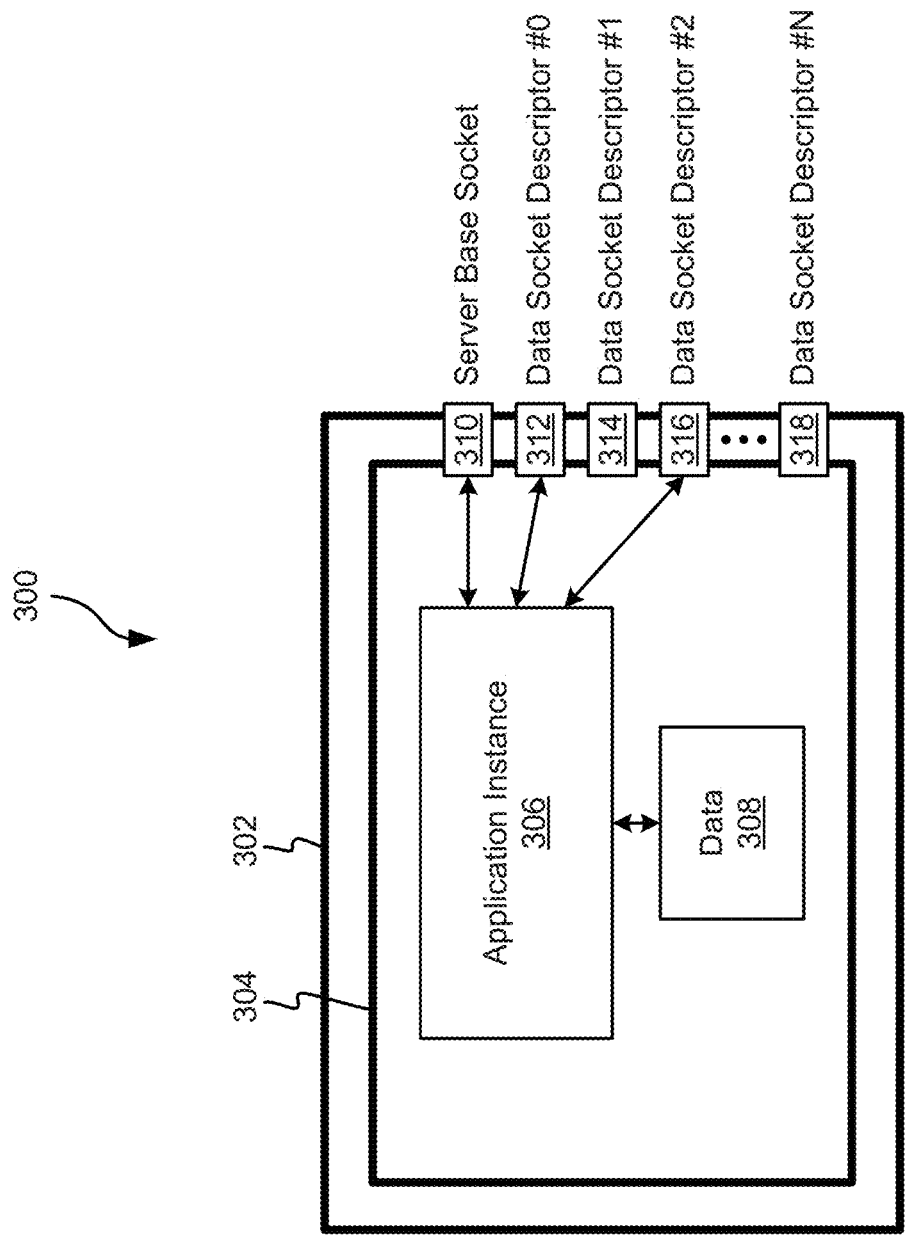
FIG. 3 shows a logical representation of an application instance operating on a computing system, in accordance with one embodiment.

Now referring to FIG. 3, a logical representation of an application instance 306 operating on a computing system 300 is shown according to one embodiment. Although only one application instance 306 and one set of data 308 is shown in FIG. 3, as would be understood by one of skill in the art, any number of application instances and groups of data may be hosted on a computing system 300, limited only by the processing power and/or other resources available to the computing system 300.

As shown in FIG. 3, an application protection layer (APL) 302 and a data protection layer (DPL) 304 are represented within the computing system 300, according to one embodiment. The application instance 306 has access to data 308 within the computing system 300. Also, the application instance 306, through any number of standard and/or custom APIs, may utilize any of a plurality of data socket descriptors (e.g., data socket descriptor #0 312, data socket descriptor #1 314, data socket descriptor #2 316, . . . , data socket descriptor #N 318) with which to communicate (send and/or receive) information outside of the application instance 306 or computing system 300. One or more server base sockets 310 is provided in the application instance 306 of computing system 300 arid is used for control of the peer application instances on the computing system 300, outside the system, or outside the application instance 306 itself, as would be understood by one of skill in the art.

In order to provide application and data protection to application instances of distributed, scaled-out applications which have instances operating on a plurality of computing systems, at least two operations may be performed, and are described below according to one embodiment.

In a first operation, application instances, such as application instance 306, are identified based upon data socket descriptor attributes that an application instance uses to communicate between other application instances and/or group(s) of application instances on/or outside of the computing system 300. For example, in response to application instance 306 utilizing data socket descriptor #0 312 consistently to communicate with another system, an association may be established between data socket descriptor #0 312 and the application instance 306. By consistently, what is meant is that application instance 306 utilizes data socket descriptor #0 312 to communicate with another system more than a predetermined number of times within a given period of time, according to one embodiment. In another embodiment, consistently utilizing a data socket descriptor means that only a specific data socket descriptor is used in exclusion of all others over a given period of time.

In a second operation, a group is formed which includes any application instance which has all of the same socket descriptor attributes (or at least a predetermined amount of the same socket descriptor attributes, or the same of a certain group of socket descriptor attributes), e.g., data exchange sockets of the same application base socket, transport protocol, server port, various multi-tenancy characteristics, storage characteristics, payload sizes, container attributes, and/or multiple time contexts are grouped together.

Any socket descriptor attributes may be considered when determining whether an application instance shares data socket descriptor attributes with another application instance, such as OS arid container attributes which include server port, transport protocol, network address translation (NAT) IP address range, maximum transmission unit (MTU), application payload sizes, user programmable attributes such as multi-tenancy labels etc.

Using the above two operations, two layers of protection (application protection arid data protection) are enacted together to protect the application (not shown) from which the application instance 306 is provided and any group of application instances related to the application that provides the application instance 306.

FIG. 3 shows the Application and Data Protection Layer (ADPL) libraries which keep track of the server base socket 310 and various data socket descriptors 312, 314, 316, . . . , 318 opened by an application instance 306 for communication of data with one or more peer applications outside of the computing system 300. The data socket descriptors 312, 314, 316, . . . , 318 are used for the exchange of data with another system outside of the computing system 300.

The data socket descriptors 312, 314, 316, . . . , 318 are numbers that represent attributes and/or characteristics of different data exchanges between the application instance and one or more receiver hosts. Each data socket descriptors 312, 314, 316, . . . , 318 may have a size ranging from 12 to 48 bits, such as 32 bits in one embodiment.

Each of the Application Protection Layer (APL) 302 and the Data Protection Layer (DPL) 304 utilize individual sets of application programming interfaces (APIs) that are configured to piggyback on existing APIs, but add specialized functionality to any action performed using the existing APIs.

These new socket APIs and data protection APIs, and the type of application payload sent and received, do not disturb the intermediate security appliances such as firewall, Intrusion Prevention and Intrusion Detection, etc.

The APL 302 provided by the ADPL APIs enables the application instance 306 to have functionality for opening base sockets, opening session-based data socket descriptors, and mirroring the data socket descriptors. These ADPL APIs are layers of APIs built around the operating system library. Apart from standard data socket functionality, these ADPL APIs provide additional functionality of data socket descriptor mirroring, managing original data socket descriptors, arid mirroring data socket descriptor sessions.

The application instance 306 utilizes the one or more server base socket(s) 310 with standard and/or private well-known port number(s) as a control socket, but opens a new data socket descriptor and allocates a different port number to the new data socket descriptor in order to handle actual functionality and data transfer between the computing system 300 and any other external or peer system. The application instance 306 utilizes the new data socket descriptors for control sessions with peer applications.

Once the control session agrees to establish communications, a separate data socket descriptor is assigned to the session for actual data transfer or interaction functionality between the peers, i.e., the server and the originator. The new data sockets and their data socket descriptors have different attributes than the base socket, but they follow the same transport layer protocol. There may be as many as 2048 session socket descriptors for a base socket.

Data socket descriptors are file descriptors assigned to offloaded data sockets for actual data transfer between two end points. This mechanism applies more to transmission control protocol (TCP) sockets than user datagram protocol (UDP) sockets. However, data socket mirroring functionality is provided to UDP sockets as well as to TCP sockets.

The server base socket 310 has the following attributes and/or characteristics:
1. A server and/or a source internet protocol (IP) interface.
2. A standard and/or known server port number, e.g., transmission control protocol (TCP) port, user datagram protocol (UDP) port, etc.
3. A maximum number of allowable waiting connections.
4. A maximum (and possibly minimum) application packet buffer size usable for transmitting and receiving data.
5. Other socket options provided by the operating system, the user, or an external input.

The above described attributes and/or characteristics may also be attributed to the plurality of allocated data socket descriptors 312, 314, 316, . . . , 318. When a connection is established between the computing system 300 and another system via the application instance 306, a data socket descriptor is allocated. The allocated data socket descriptor has the following attributes and/or characteristics:
1. A server and/or a source IP interface.
2. A standard and/or known server port number, e.g., TCP port, UDP port, etc.
3. A maximum number of allowable waiting connections.
4. Application packet buffer size for transmit and receive.
5. A port number of the transport of the allocated data socket descriptor (in the computing system 300).

6. An IP address of the peer data socket descriptor (in an external system) of the allocated data socket descriptor (usually, but not always, in TCP sockets).
7. A port number of the transport of the peer data socket descriptor of the allocated data socket descriptor in all cases of controlled port allocations by the application instance 306.
8. A maximum (and possibly minimum) application packet buffer size usable for transmitting data to and receiving data from (transmissions with) the peer data socket descriptor.

Apart from the above described characteristics and/or attributes, additional characteristics that may be attributable to an allocated data socket descriptor include:

9. A first identifier ($ID_1$): a globally unique identification number given for an entity (such as an enterprise, company, university, city subdivision, etc.) that utilizes the ADPL mechanism in the application instances or programmed for proprietary purposes
10. A second ID ($ID_2$): a unique identification number within the entity (not necessarily globally unique). Each $ID_2$ represents a subdivision within the entity, such as an individual business unit within an enterprise, a water district within a city, etc., or programmed for proprietary purposes.
11. Secure base signature: a base signature or scrambled alphanumeric or numerical code used in the generation of signatures per data socket descriptor.
12. Secure runtime signature: a scrambled alphanumeric or numerical code used as a signature on a per data socket descriptor basis.
13. Application name: a name given to the application instance operating on the computing system.
14. Application ID: an identification number provided to the application instance operating on the computing system.
15. Process ID: an identification number provided to a particular process which is accountable for the data.
16. Server port: the particular port on the server on which data is received or sent.
17. Transport protocol: the particular transport protocol used to send data.
18. Base Crypto Version: the version of the cryptographic process used to encrypt data.
19. Co-Lo Need: Co-locationing criterions where applications or application instances may reside together in the same server, server pool, rack, pod, or data center.
20. Architecture Tier: a tier within the system architecture on which the (web, application, database, etc.) operates.
21. Storage Attachments: an attribute that describes how the storage is attached to the computing system (e.g., direct, network, distributed, etc.)
22. Proprietary Multi-Tenant Label: a label within the ADPL tag which designates some information selectable by the user.

These unique attributes when combined together in one of many different variations, are able to identify a data socket descriptor, and locks that data socket descriptor to one particular instance of a scaled-out application group.

In one embodiment, data socket descriptor-based mirroring may De performed intelligently for precisely required states of applications or application instances operating on servers in a data center. Moreover, data socket descriptor-based mirroring may be performed for an exact number of packets or payloads to catch an identified symptom. These actions are riot capable of being performed using conventional mirroring mechanisms. On top of the lack of precision, current approaches examine every packet or payload belonging to all the servers in the data center segment where the network switch performs port-based mirroring. This requirement adds a performance penalty since every packet or payload must be examined in order to minor the specific flow.

Therefore, the data socket descriptor-based mirroring mechanism operates at a level that enables such desirable functionality. It also provides complete flexibility and programmability to control mirroring from the applications and application instances as well as via external policies for a particular data socket descriptor.

While mirroring data socket descriptors, any or all of the above described attributes may be used to selectively mirror packets or payloads being sent over the data socket.

Figure 4A:
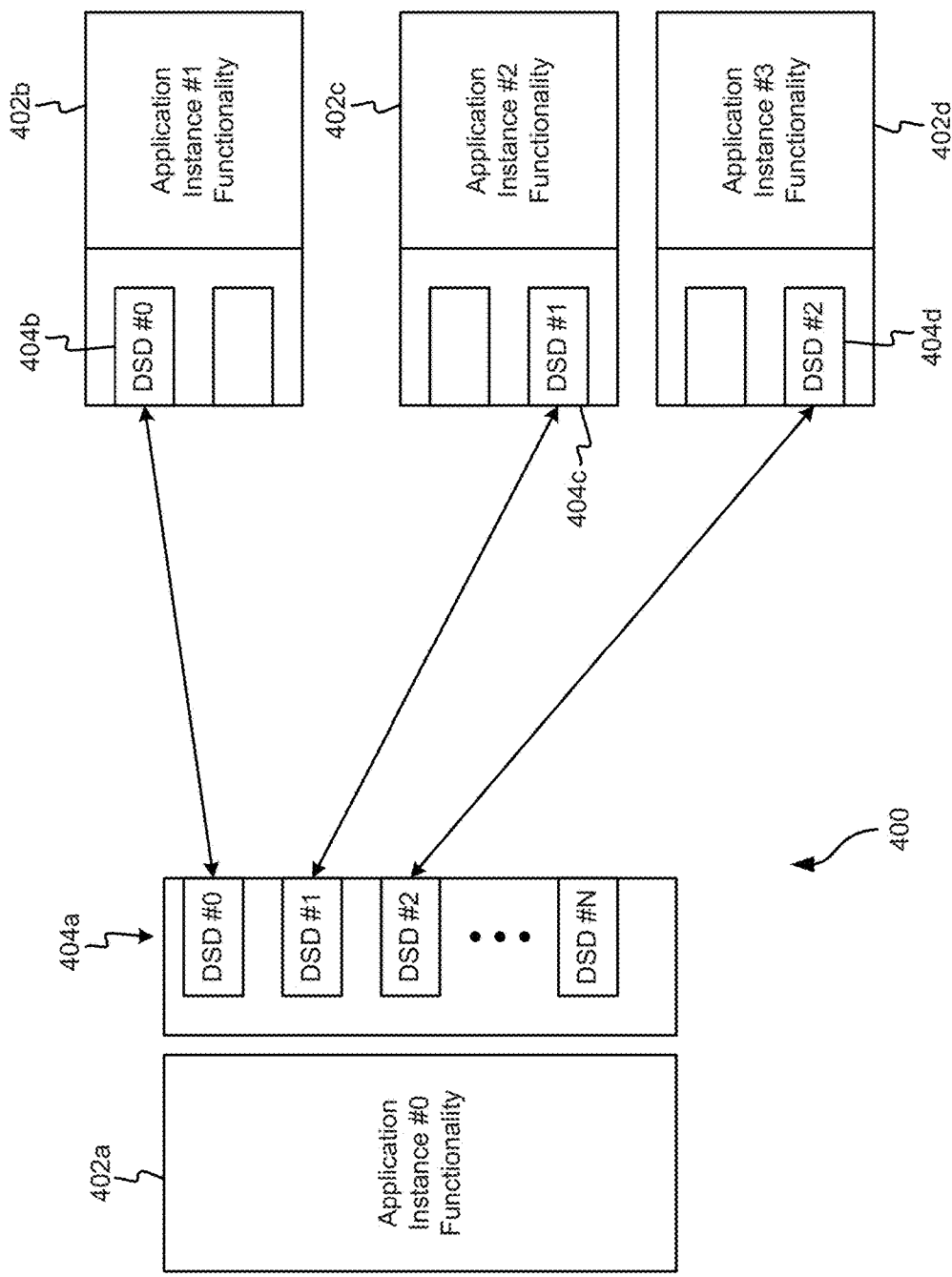
FIG. 4A shows normal data socket descriptor functionality, according to one embodiment.

Now referring to FIG. 4A, normal data socket descriptor functionality 400 is shown between multiple application or application instances during data transfer, according to one embodiment. Application Instance #0 402*a* utilizes data socket descriptors 404*a* #0, #1, #2, . . . , #N. Application Instance #1 402*b* communicates with data socket descriptor #0 on Application Instance #0 402*a* via data socket descriptor #0 404*b*. Application Instance #2 402*c* communicates with data socket descriptor #1 on Application Instance #0 402*a* via data socket descriptor #1 404*c*. Application Instance #3 402*d* communicates with data socket descriptor #2 on Application Instance #0 402*a* via data socket descriptor #2 404*d*.

Figure 4B:
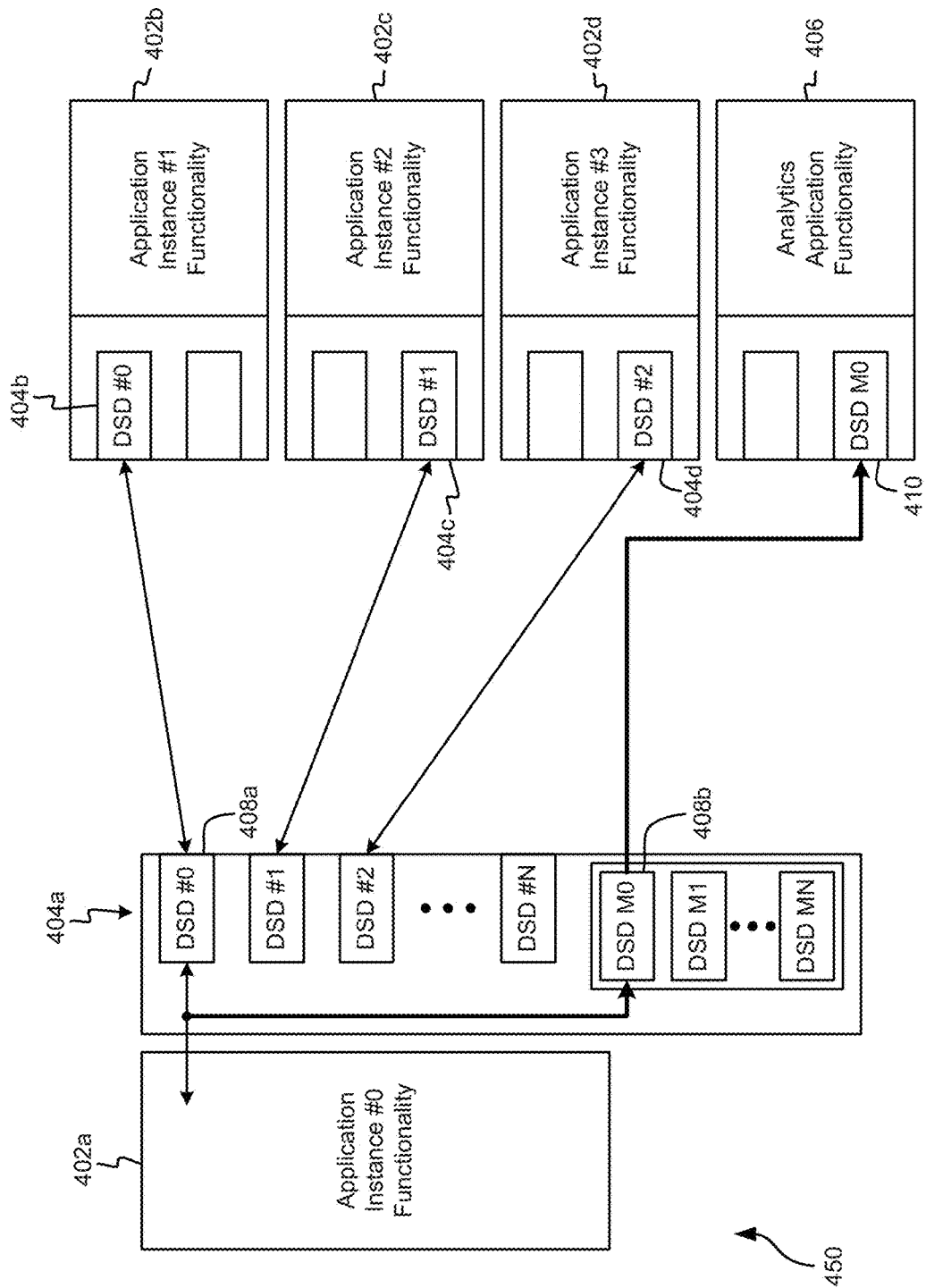
FIG. 4B shows mirroring data socket descriptor functionality, according to one embodiment.

As shown in FIG. 4B, to perform mirroring functionality 450, standard socket APIs are modified and/or additional functionality is added around standard socket APIs.

Mirroring may take place as ingress payload mirroring or as egress payload mirroring. For egress payload mirroring, the application buffer and metadata associated with the application buffer and/or mirroring operation is copied and sent. As shown in FIG. 4B, mirrored data socket descriptors #0-N are copied as mirroring data socket descriptors Mo-MN. The application buffer and metadata is sent in UDP/IP or TCP/IP transport packets.

The mirrored data socket is the data socket descriptor which receives (on the ingress side) or transmits (on the egress side) the packet or payload. This mirrored data socket descriptor #0 408*a* is copied as data socket descriptor Mo 408*b* and is sent to an analytics server 406 as DSD Mo 410 for analysis, tracking, etc. The mirroring data socket descriptor Mo 408*b* connects Application Instance #0 402*a* to the analytics server 406 using UDP or TCP protocol. Moreover, analytics application descriptors (e.g., DSD Mo 410) are descriptors which receive mirrored payloads and associated metadata on the analytics application(s) operating on the analytics server 406.

The new APIs and mechanism manage the mirrored data socket descriptors (e.g., DSD #0 408*a*) and mirroring data socket descriptors (e.g., DSD Mo 408*b*). The mirrored payload is in the form of metadata and a payload. The metadata comprises an original source, destination port and/or address, source port and/or address, time stamp, base server port, and other details of the payload. As per the policies or configuration, the associated mirroring data socket is identified for this payload on the source data socket descriptor. Together with metadata identifying this payload and mirroring arrangement, the payload is sent to the peer end of the mirroring data socket descriptor (Application Instance #1 402*b*). One or more mirrored data socket descriptors may be mirrored as one or more mirroring data socket descriptors in various embodiments. Moreover, any mirrored payloads including metadata and the payload may be sent to the analytics server 406 for analysis, tracking, etc.

Figure 5:
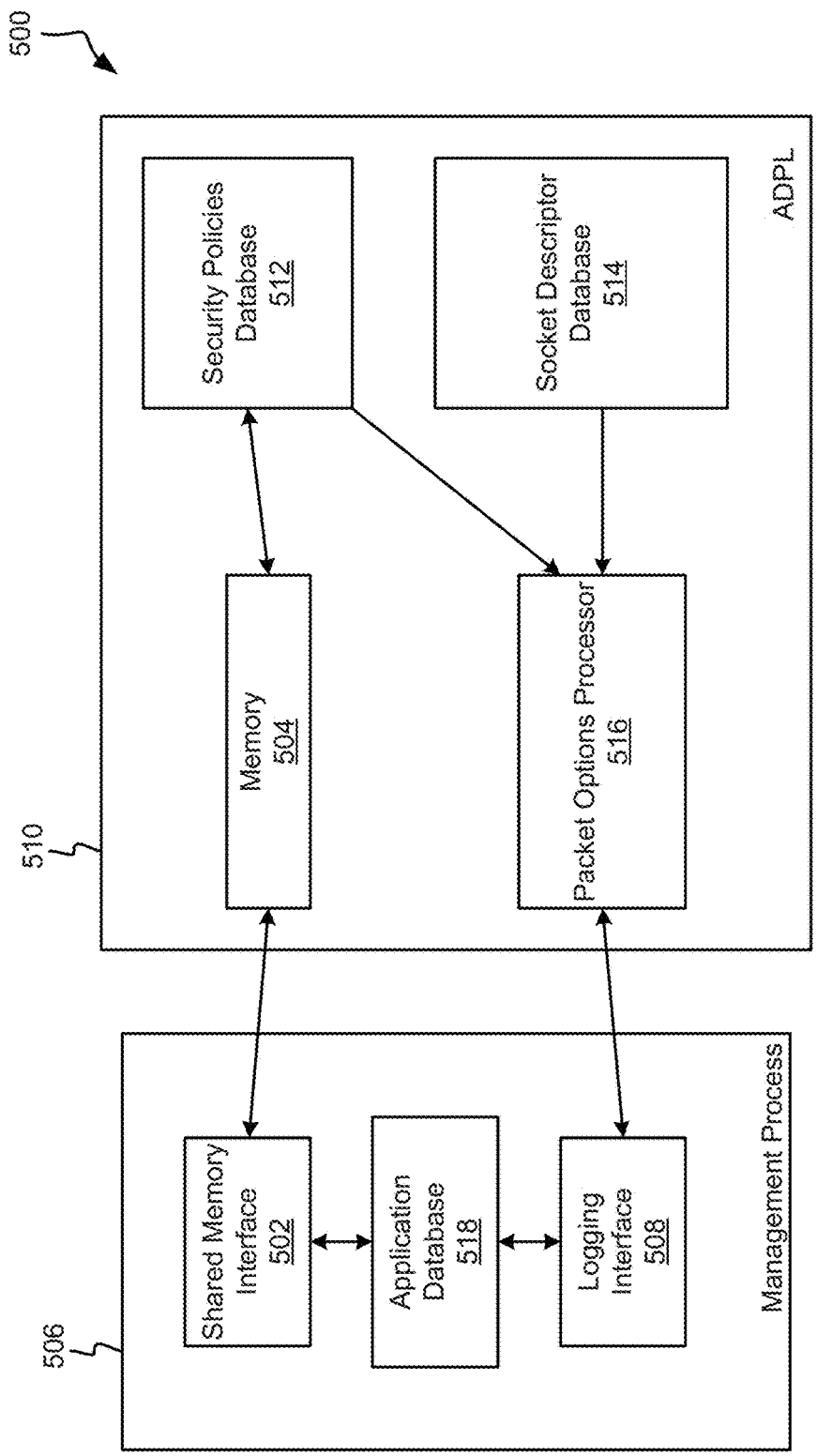
FIG. 5 shows the ADPL architecture according to one embodiment.

Now referring to FIG. 5, the ADPL architecture 500 is shown according to one embodiment. A shared memory interface 502 (also referred to as a message queue) is used by inter-process communications (IPC) for multiple process communications, including messaging, using a memory 504, which may be a shared memory in one embodiment. The shared memory interface 502 is used to send and receive configuration and data between the management process 506 and ADPL libraries (target applications) 510. The size of the memory 504 is set to be of a size to ensure optimum messaging performance.

The logging interface 508 utilizes the management process 506 on one side and the ADPL 510 on the other side. The management process 506 is a message multiplexer in one embodiment. Moreover, the management process 506 may De an independent module, thread, and/or process created when the first application instance using the ADPL 510 is spawned. The application instance calls an ADPL socket API for communication with other entities. The ADPL API checks for the presence of the management process 506. In response to a determination that the process exists, the ADPL API registers itself with the management process 506 along with all its associated and/or requested attributes. During run time, the ADPL API registers each data socket descriptor opened for communication in the Socket Descriptor Database 514 kept with the application instance by the ADPL API. The Socket Descriptor Database 514 includes a list of all registered data sockets with associated data socket descriptors, DIP, base keys, and a latest key for transmission. Policy functions may be added, deleted, modified, and searched within the Socket Descriptor Database 514.

The management process 506 may be configured to perform and/or maintain the following functionality:
1. Track existing and new application instances on the server including their individual communication sessions at the base socket level and at the data socket descriptor level in both discovery-only mode and in protection mode.
2. Store a list of the latest and/or most active applications that utilize ADPL in protection mode, and applications that utilize ADPL in discovery-only mode.
3. Perform configuration management including forwarding configuration messages and other messages between the ADPL and the policy orchestrator.
4. Perform application health checks and monitor the health of registered applications that utilize ADPL in protection mode.

In addition, the Application Database 518 within the management process 506 is configured to have a list of registered applications stored therein based on data socket descriptor discovery.

The management process 506 is configured to utilize all the application registry data to provide the application tracking function. Every time a new application or data socket is registered, details/attributes of the new application and/or data socket are provided to the policy orchestrator that is configured to control the configuration and details of each individual application instance. The socket descriptor details provided by the management process 506 from individual servers help the policy orchestrator to group all the data socket descriptors and application instances together to form a larger picture of all the applications running across the data center, also referred to as application visualization.

The management process 506 is also configured to communicate with the policy orchestrator, which in turn provides policy related configuration to the management process 506 to be applied to individual data socket descriptors of the application instance. On the other hand, the management process 506 communicates with the application instance and provides the application instance with the configuration.

The management process 506 is also configured to check the health of application instances via health check messages, among other mechanisms. This health check information in run-time may be used to keep track of the health of each individual application instance, especially the application process status. Using this information for application performance, distribution of workloads and trouble-shooting of the scaled out application is possible.

The Security Policies Database 512 includes hash-based keys for each policy. The Socket Descriptor Database 514 includes a list of all registered data sockets with associated data socket descriptors, DIP, base keys, and a latest key for transmission. The packet options processor 516 is configured to provide packet processing, and may include some or all of the following functionality: packet receive processing, reading data socket options, keys processing per security policies, security profile processing per security policies, finding violations and updating keys, and updating logs.

FIG. 6 shows an E-W policy mapping 600 according to one embodiment. The fields included in the mapping 600 include, but are not limited to, policy name 602, which indicates the name of the data security policy; source IP 604, which indicates the source of the interaction, e.g., the peer server IP address of the socket descriptor (per socket descriptor); destination IP 606, an optional field which indicates the IP address of the recipient; server port 608, which indicates the particular port on the server on which data is received or sent, e.g., application base port; ID1 610, which indicates a globally unique identification number given by the library mechanism for an entity (such as an enterprise, company, university, city subdivision, etc.) that utilizes the ADPL mechanism in the application instances or programmed for proprietary purposes; ID2 612, which indicates a unique identification number within the entity (not necessarily globally unique) given by the library mechanism; base signature 614 field, which indicates a first received secure source signature in an exchange over a particular session on a data socket (the recipient party in the data socket session sends a secure source signature to the originating party, and this signature is stored and becomes the baseline for all future transactions across the data socket); MTU 616, which indicates a Maximum Transfer Unit of physical media; App. Buffer Size 618, which indicates a size of the buffer the application instance uses to send or receive data over this socket descriptor; action 620 which indicates one or more of a plurality of actions that may be performed, such as dynamic cache flush, data redaction, cache locking, in-memory locking, etc.; sub-action 622, which indicates a further action that may be performed in addition to the action, such as logging which logs the details of the action taken with information in log files, traps which send indication to a remote monitor or controller entity with information about the action, triggering an event which forms an event with all associated information and sends it for further processing by external controller entities, mirroring which performs a dynamic, real-time action of capturing the payload or the flow and sending it as is, out to other external analytical or processing devices for deeper analysis and processing, etc.; and server group 624, which indicates the name of the application server group (also referred to as a pico-segment) given by the application instance and/or ADPL.

The action 620 field in the E-W mapping 600 is configured to indicate and cause the following actions: allow, which indicates to allow the packet to be received and keep statistics; allow-and-analyze which indicates to receive the packet or payload, keep the statistics thereof, and send the payload to be analyzed for security issues; drop, which indicates to cause the packet to be dropped, to keep statistics, and to log the drop; drop-and-analyze, which indicates to drop the packet or payload, keep the statistics thereof, and send the payload to be analyzed for security issues; rate-limit, which indicates that the amount of data should be limited based on the security profile; and mirror, which indicates to copy the packet or payload to an external third party tool, such as an analytics application operating on an analytics server for inspection, tracking, analysis, etc.

The sub-action 622 field in the E-W mapping 600 is configured to indicate and cause the following actions: log, which indicates to dump the log for the data socket for analysis; trap, which indicates to trap the packet for analysis; and event, which indicates that some further event is triggered, such as a predefined internal event of a session drop which in turn maps to a session drop event of external third party management tools.

FIG. 7 shows a North-South (N-S) policy mapping 700 according to one embodiment. The only differences between the E-W mapping 600 of FIG. 6 and the N-S policy mapping 700 of FIG. 7 is that the ID1 610 field, the ID2 612 field, and base signature 614 field are optional fields that may or may not be present in the N-S policy mapping 700, according to various embodiments. However, the actions and sub-actions available are the same for N-S policy mapping 700 as for the E-W policy mapping 600 of FIG. 6, according to this embodiment.

Figure 8:
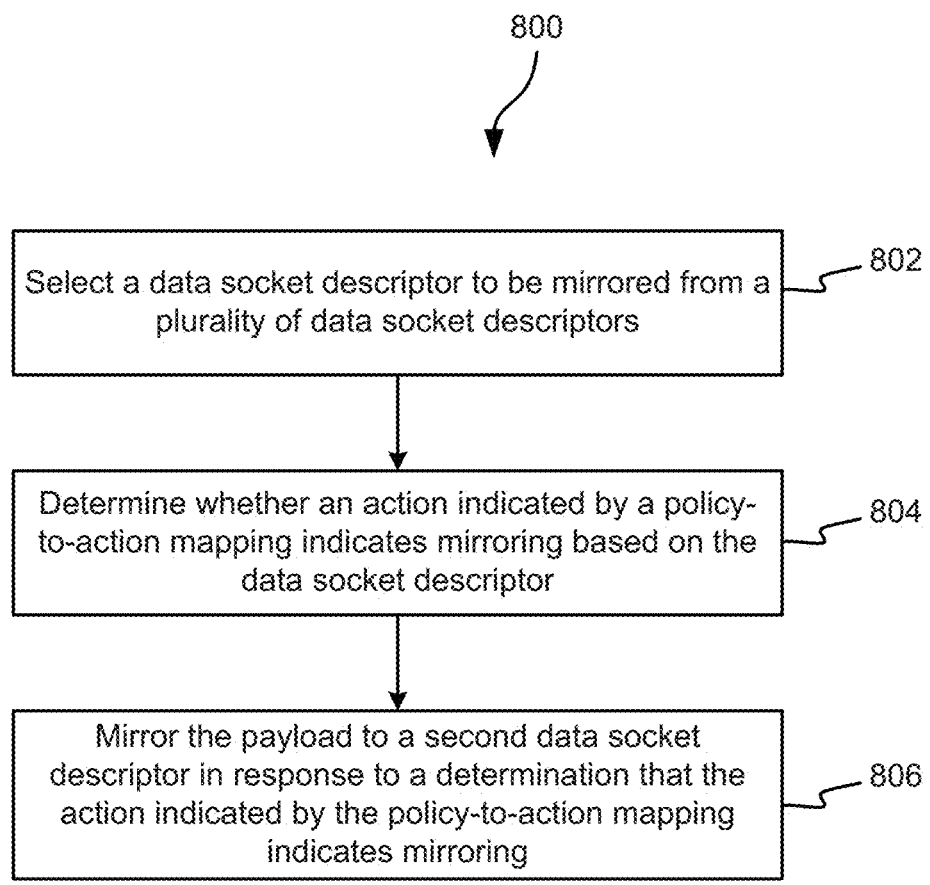
FIG. 8 shows a flowchart of a method, according to one embodiment.

Now referring to FIG. 8, a flowchart of a method 800 for mirroring is shown according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be apparent to one of skill in the art upon reading the present descriptions.

Each of the steps of the method 800 may be performed by any suitable component of the operating environment. For example, in various embodiments, the method 800 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 800. Illustrative processing units include, but are not limited to, a central processing unit (CPU), an ASIC, a FPGA, etc., combinations thereof, or any other suitable computing device known in the art.

As shown in FIG. 8, method 800 may initiate with operation 802, where a data socket descriptor to be mirrored is selected from a plurality of data socket descriptors. This decision may be based on one or more policies and/or configuration settings.

In operation 804, it is determined whether an action indicated by a policy-to-action mapping indicates mirroring based on the data socket descriptor.

The policy-to-action mapping may further include actions including allow_analyze, where a payload is sent to a destination application and mirrored to an analytics application; drop_analyze, where the payload is not sent to the destination application, but instead is mirrored to the analytics application. In such a case, the sender or the peer of the application may be directly connected to the analytics application for interaction therewith.

In operation 806, in response to a determination that the action indicated by the policy-to-action mapping indicates mirroring, the payload is mirrored to second data socket descriptor. This second data socket descriptor is not limited to analytics purposes, and may be used to store the flow for performance of one or more additional operations on data of the payload.

Figure 9:
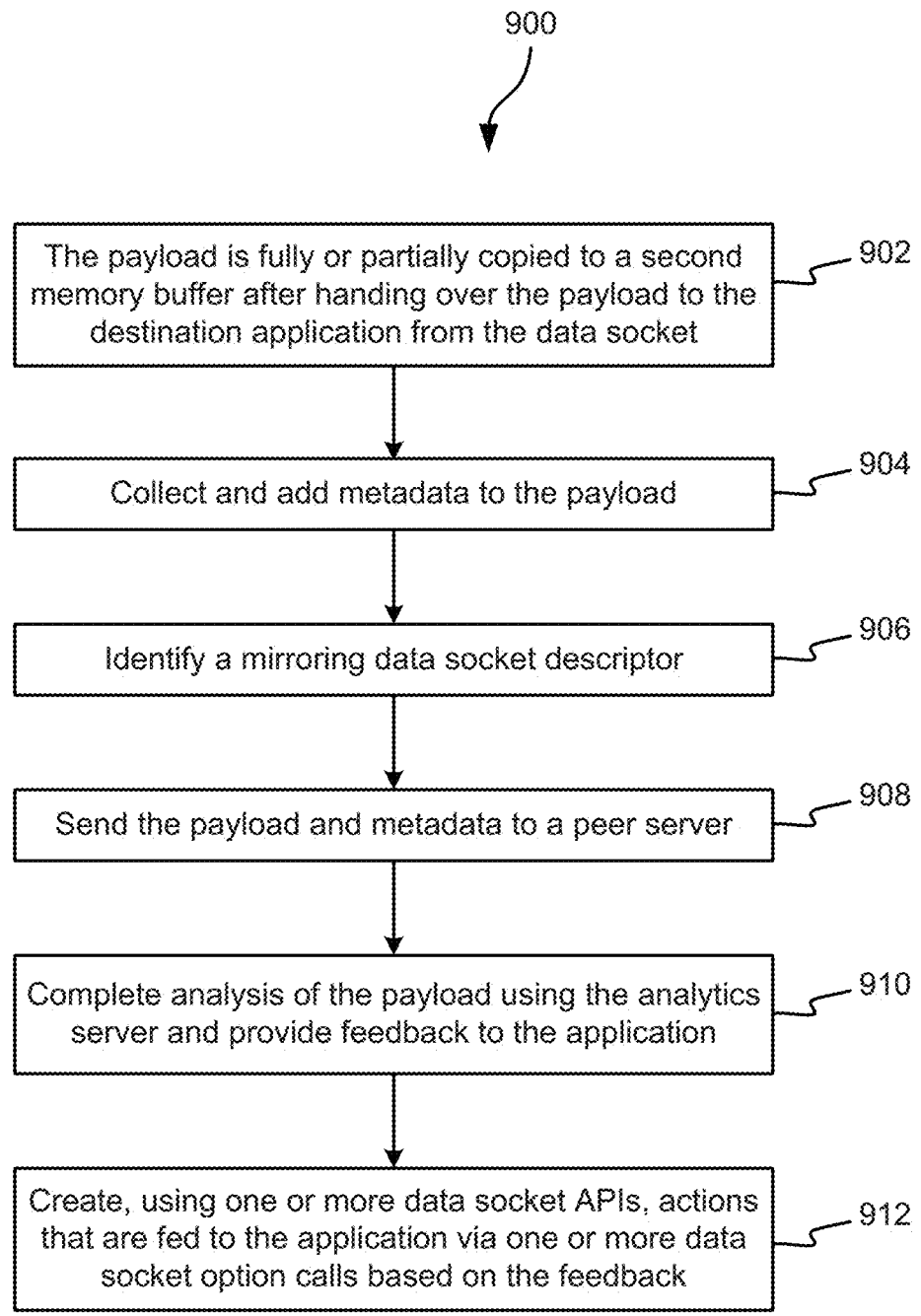
FIG. 9 shows a flowchart of a method, according to one embodiment.

Now referring to FIG. 9, a flowchart of a method 900 for ingress mirroring is shown according to one embodiment. The method 900 may be performed in accordance with the present invention in any of the environments depicted in FIGS. 1-7, among others, in various embodiments. Of course, more or less operations than those specifically described in FIG. 9 may be included in method 900, as would be apparent to one of skill in the art upon reading the present descriptions.

Each of the steps of the method 900 may be performed by any suitable component of the operating environment. For example, in various embodiments, the method 900 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 900. Illustrative processing units include, but are not limited to, a CPU, an ASIC, a FPGA, etc., combinations thereof, or any other suitable computing device known in the art.

As shown in FIG. 9, method 900 may initiate with operation 902, where, after handing over the payload to the destination application from the data socket, the payload is fully or partially copied to a second memory buffer.

In operation 904, metadata (e.g., SIP, DIP, SPORT, DPORT, ID1, ID2, secure signature, server base port, time stamp, socket options from operating system, etc.) is collected and added to a top of the payload.

In operation 906, a mirroring data socket descriptor is identified. In response to a determination that the mirroring data socket descriptor is not open, a new data socket descriptor service is opened to the analytics application or to a target mirroring server.

In operation 908, the payload and metadata is sent to a peer server. When it is indicated to have analytics performed on the payload, the analysis of the complete flow starts at the analytics server.

In operation 910, the analytics server completes the analysis of the payload and provides feedback to the application.

In operation 912, based on the feedback, one or more data socket APIs create actions that are fed to the application via one or more data socket option calls. Actions include dynamic redaction, cache flush, memory lock (rows or columns of databases), etc.

Figure 10:
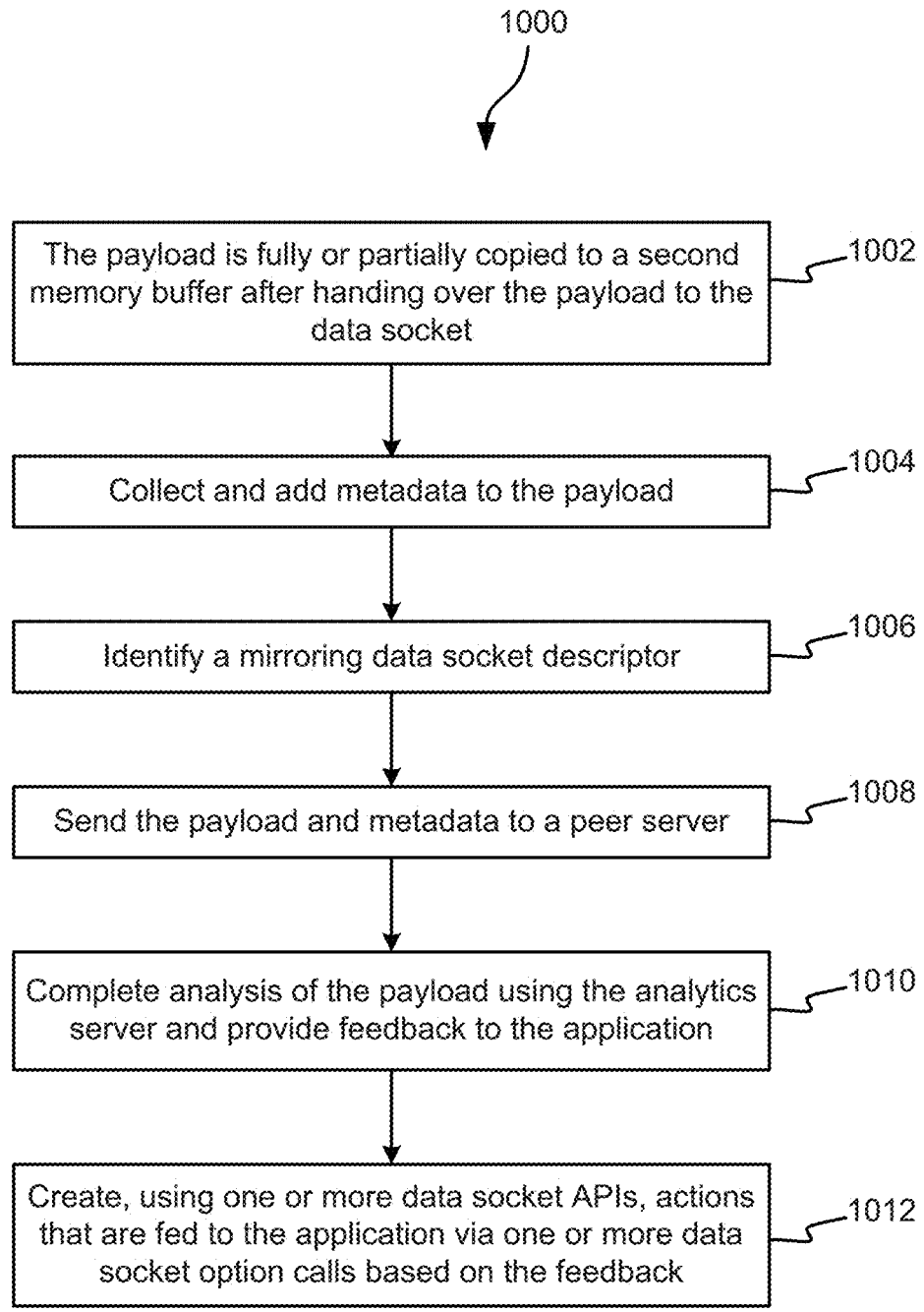
FIG. 10 shows a flowchart of a method, according to one embodiment.

Now referring to FIG. 10, a flowchart of a method 1000 for egress mirroring is shown according to one embodiment. The method 1000 may be performed in accordance with the present invention in any of the environments depicted in FIGS. 1-7, among others, in various embodiments. Of course, more or less operations than those specifically described in FIG. 10 may be included in method 1000, as would be apparent to one of skill in the art upon reading the present descriptions.

Each of the steps of the method 1000 may be performed by any suitable component of the operating environment. For example, in various embodiments, the method 1000 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 1000. Illustrative processing units include, but are not limited to, a CPU, an ASIC, a FPGA, etc., combinations thereof, or any other suitable computing device known in the art.

As shown in FIG. 10, method 1000 may initiate with operation 1002, where, after handing over the payload to the data socket, the payload is fully or partially copied to a second memory buffer.

In operation 1004, metadata (e.g., SIP, DIP, SPORT, DPORT, ID1, ID2, secure signature, server base port, time stamp, socket options from operating system, etc.) is collected and added to a top of the payload.

In operation 1006, a mirroring data socket descriptor is identified. In response to a determination that the mirroring data socket descriptor is not open, a new data socket descriptor service is opened to the analytics application or to a target mirroring server.

In operation 1008, the payload and metadata is sent to a peer server. When it is indicated to have analytics performed on the payload, the analysis of the complete flow starts at the analytics server.

In operation 1010, the analytics server completes the analysis of the payload and provides feedback to the application. The analysis may include identifying whether the data exchange being performed by the application is legitimate, valid, and normal behavior. Furthermore, in contrast, it may be determined whether the application has taken over by a malicious module inserted on top of the application or somewhere else in the stack.

In operation 1012, based on the feedback, one or more data socket APIs create actions that are fed to the application via one or more data socket option calls. Actions include dynamic redaction, cache flush, memory lock (rows or columns of databases), etc.

Referring now to FIGS. 8-10, methods 800, 900, and/or 1000 may De performed alone, in series and/or in parallel with one another in various embodiments.

In one particular embodiment, a method may include receiving, at a first host on which an application instance is operating, an application or data security policy for a first data socket descriptor indicating to mirror one or more payloads received or transmitted by the first data socket descriptor of the application instance. Moreover, in response to the one or more actions indicated by the application and data security policy, the first host may perform at least one action, such as allow-and-analyze, drop-and-analyze, and mirror. The mirror action is performed at a data socket descriptor level.

In a further embodiment, the at least one action may be performed dynamically on a per-session basis contingent upon a risk indicated by the security policy of the first host. Furthermore, in some cases, a different action may be applied for each different database application at different times depending upon a security profile of a particular session at the different time.

In one embodiment, a time-bound mirroring policy may be enacted on the first host at a socket descriptor level by a scheduler, the time-bound mirroring policy may dictate a first time to begin the mirror action and a time period during which the mirror action is performed. Moreover, the scheduler may also indicate which data socket descriptors to apply the time-bound mirroring policy to, and whether any additional actions are to be performed in response to payloads being received during the time-bound period of the mirroring policy.

In another embodiment, the method may include receiving a payload using the application instance operating on the first host and collecting metadata related to the payload. The metadata may include any relevant information about the payload and/or data socket descriptor on which it was received, such as information associated with an application buffer, the mirroring action, an original source, a destination port and/or address, a source port and/or address, a time stamp, a base server port, etc.

According to a further embodiment, the method may include sending the payload and the metadata related to the payload from the application instance to an analytics server application for real time security analysis in response to a determination to analyze the payload based on enforcement of the security policy applied to the first data socket descriptor.

Moreover, the method may include receiving feedback from the analytics server application based on the payload and the metadata related to the payload, and processing the feedback and applying application and data security policies using an application and data protection layer operating on the first host using the feedback from the analytics server application.

Methods 800, 900, and/or 1000 may be implemented as a system, process, or a computer program product. As a system, method goo may be implemented on a host and/or server as logic configured to perform e or more of methods 800, 900, arid 1000, along with being implemented on any other hosts or servers. As a computer program product, a computer readable storage medium may store program instructions configured to perform one or more of methods 800, 900, and 1000.

In another example, a system may include a processing circuit and logic integrated with and/or executable by the processing circuit. The processing circuit is a non-transitory hardware device configured to execute logic embedded therein, or provided thereto. Examples of processing circuits include, but are not limited to, CPUs, ASICs, FPGAs, microprocessors, integrated circuits, etc. The logic is configured to cause the processing circuit to perform one or more of methods 800, 900, and 1000.

In another example, a computer program product may include a computer readable storage medium having program instructions stored thereon. The computer readable storage medium is a non-transitory device configured to store program instructions that are executable and/or readable by a processing circuit. The program instructions are executable by a processing circuit to cause the processing circuit to perform one or more of methods 800, 900, and 1000.

Variations of the systems, methods, and computer program products described herein are also possible, and the explicit description thereof in this document is not required in order to provide those of skill in the art with the ability to conceive of such variations when reading the present descriptions.

What is claimed is:

1. A computer-implemented method, comprising:
receiving, at a first host on which an application instance is operating, an application or data security policy for a first data socket descriptor indicating to perform one or more actions, the one or more actions including mirroring one or more payloads received or transmitted by the first data socket descriptor of the application instance; and
in response to the indication by the application and data security policy to perform the one or more actions, performing, by the application on the first host, the mirroring and at least one additional action selected from the group consisting of:
allow;
allow-and-analyze;
allow_analyze;
drop;
drop-and-analyze;
drop_analyze;
rate limit; and
combinations thereof;
wherein performing the additional action allow comprises allowing the application instance to receive a payload of a packet received via the first data socket descriptor;
wherein performing the additional action allow-and-analyze comprises:
allowing the application instance to receive the payload of the packet received via the first data socket descriptor; and
retaining statistics relating to the packet;
wherein performing the additional action allow analyze comprises:
allowing the application instance to receive the payload of the packet; and
mirroring the packet to an external security analytics application;
wherein performing the additional action drop comprises:
dropping the packet;
retaining statistics relating to the packet; and
logging the drop of the packet;
wherein performing the additional action drop-and-analyze comprises:
dropping the packet;
retaining statistics relating to the packet; and
mirroring the packet to the external security analytics application;
wherein performing the additional action drop analyze comprises:
dropping the payload of the packet; and
mirroring the packet to the external security analytics application; and
wherein performing the additional action rate limit comprises: limiting an amount of data transmitted via the first data socket descriptor based on the received application or data security policy.

2. The method as recited in claim 1, wherein the at least one additional action is performed dynamically on a per-session basis contingent upon a risk indicated by the security policy of the first host.

3. The method as recited in claim 1, wherein a time-bound mirroring policy is enacted by a scheduler for the first data socket descriptor that dictate a first time to begin the mirror action and a time period during which the mirror action is performed.

4. The method as recited in claim 1, wherein the mirror action is performed at a data socket descriptor level.

5. The method as recited in claim 1, further comprising, in response to the indication by the application and security data policy to perform the one or more actions, performing one or more sub-actions selected from the group consisting of: log; trap; and event.

6. The method as recited in claim 1, wherein the at least one additional action is selected from the group consisting of: the allow-and analyze, the drop-and-analyze, and combinations thereof; and
wherein an analysis is performed in accordance with: the allow-and analyze, the drop-and-analyze, or a combination thereof; and
wherein the analysis comprises:
identifying whether a data exchange being performed by the application instance constitutes legitimate, valid, and normal behavior and valid query code; and
determining whether the application instance has been taken over by a malicious module.

7. The method as recited in claim 1, further comprising:
receiving a payload using the application instance operating on the first host;
collecting metadata related to the payload;
sending the payload and the metadata related to the payload from the application instance to an analytics server application for real time security analysis in response to a determination to analyze the payload based on enforcement of the security policy applied to the first data socket descriptor;
receiving feedback from the analytics server application based on the payload and the metadata related to the payload; and
processing the feedback and applying application and data security policies using an application and data protection layer operating on the first host using the feedback from the analytics server application.

8. A system, comprising:
a processing circuit and logic integrated with and/or executable by the processing circuit, the logic being configured to cause the processing circuit to:
receive, at a first host on which an application instance is operating, an application or data security policy for a first data socket descriptor indicating to perform one or more actions including to mirror one or more payloads received and/or transmitted by the first data socket descriptor of the application instance; and
perform, by the first host, at least one action selected from a group of additional actions in response to the indication by the application and data security policy to perform the one or more actions, the group of additional actions being selected from the group consisting of:
allow;
allow-and-analyze;
allow_analyze;
drop;
drop-and-analyze;
drop_analyze;
rate limit; and
combinations thereof;
wherein performing the additional action allow causes the processing circuit to allow the application instance to receive a payload of a packet received via the first data socket descriptor;

wherein performing the additional action allow-and-analyze causes the processing circuit to:
allow the application instance to receive a payload of a packet received via the first data socket descriptor; and
retain statistics relating to the packet;
wherein performing the additional action allow analyze causes the processing circuit to:
allow the application instance to receive the payload of the packet; and
mirror the packet to an external security analytics application;
wherein performing the additional action drop causes the processing circuit to:
drop the packet;
retain statistics relating to the packet; and
log the drop of the packet;
wherein performing the additional action drop-and-analyze causes the processing circuit to:
drop the packet;
retain statistics relating to the packet; and
mirror the packet to the external security analytics application;
wherein performing the additional action drop analyze causes the processing circuit to:
drop the payload of the packet; and
mirror the packet to the external security analytics application; and
wherein performing the additional action rate limit causes the processing circuit to: limit an amount of data transmitted via the first data socket descriptor based on the received application or data security policy.

9. The system as recited in claim 8, wherein the at least one action is performed dynamically on a per-session basis contingent upon a risk indicated by the security policy of the first host.

10. The system as recited in claim 8, wherein a time-bound mirroring policy is enacted by a scheduler for the first data socket descriptor that dictate a first time to begin the mirror action and a time period during which the mirror action is performed.

11. The system as recited in claim 8, wherein the mirror action is performed at a data socket descriptor level.

12. The system as recited in claim 8, wherein the logic further causes the processing circuit to:
receive a payload using the application instance operating on the first host;
collect metadata related to the payload; and
send the payload and the metadata related to the payload from the application instance to an analytics server application for real time security analysis in response to a determination to analyze the payload based on enforcement of the security policy applied to the first data socket descriptor;
receive feedback from the analytics server application based on the payload and the metadata related to the payload; and
process the feedback and apply application and data security policies using an application and data protection layer operating on the first host using the feedback from the analytics server application.

13. A computer program product, comprising a computer readable storage medium having program instructions stored thereon, the program instructions being executable by a processing circuit to cause the processing circuit to:
receive, at a first host on which an application instance is operating, an application or data security policy for a first data socket descriptor indicating to perform one or more actions including mirroring one or more payloads received and/or transmitted by the first data socket descriptor of the application instance; and
perform, by the first host, at least one action selected from a group of additional actions in response to the indication by the application and data security policy to perform the one or more actions, the group of additional actions being selected from the group consisting of:
allow;
allow-and-analyze;
allow_analyze;
drop;
drop-and-analyze;
drop_analyze;
rate limit; and
combinations thereof;
wherein the program instructions executable by the processing circuit to cause the processing circuit to perform the additional action allow comprise program instructions executable by the processing circuit to cause the processing circuit to: allow the application instance to receive a payload of a packet received via the first data socket descriptor;
wherein the program instructions executable by the processing circuit to cause the processing circuit to perform the additional action allow-and-analyze comprise program instructions executable by the processing circuit to cause the processing circuit to: allow the application instance to receive a payload of a packet received via the first data socket descriptor; and
retain statistics relating to the packet;
wherein the program instructions executable by the processing circuit to cause the processing circuit to perform the additional action allow analyze comprise program instructions executable by the processing circuit to cause the processing circuit to: allow the application instance to receive the payload of the packet; and
mirror the packet to an external security analytics application;
wherein the program instructions executable by the processing circuit to cause the processing circuit to perform the additional action drop comprise program instructions executable by the processing circuit to cause the processing circuit to:
drop the packet;
retain statistics relating to the packet; and
log the drop of the packet;
wherein the program instructions executable by the processing circuit to cause the processing circuit to perform the additional action drop- and analyze comprise program instructions executable by the processing circuit to cause the processing circuit to:
drop the packet;
retain statistics relating to the packet; and
mirror the packet to the external security analytics application;
wherein the program instructions executable by the processing circuit to cause the processing circuit to perform the additional action drop analyze comprise program instructions executable by the processing circuit to cause the processing circuit to:
drop the payload of the packet; and mirror the packet to the external security analytics application; and wherein the program instructions executable by the processing circuit to cause the processing circuit to perform the additional action rate limit comprise program instructions executable by the processing circuit to cause the processing circuit to: limit an amount of data transmitted via the first data socket descriptor based on the received application or data security policy.

14. The computer program product as recited in claim 13, wherein the at least one action is performed dynamically on a per-session basis contingent upon a risk indicated by the security policy of the first host.

15. The computer program product as recited in claim 13, wherein a time-bound mirroring policy is enacted by a scheduler for the first data socket descriptor that dictate a first time to begin the mirror action and a time period during which the mirror action is performed.

16. The computer program product as recited in claim 13, wherein the mirror action is performed at a data socket descriptor level.

17. The computer program product as recited in claim 13, wherein the at least one additional action is selected from the group consisting of: the allow-and analyze, the allow_analyze, the drop-and-analyze, the drop_analyze, and combinations thereof; and wherein an analysis is performed in accordance with: the allow-and analyze, the allow_analyze, the drop-and-analyze, the drop_analyze, or a combination thereof; and wherein the analysis comprises:

identifying whether a data exchange being performed by the application instance constitutes legitimate, valid, and normal behavior; and determining whether the application instance has been taken over by a malicious module.

18. The computer program product as recited in claim 13, wherein the program instructions further cause the processing circuit to:

receive a payload using the application instance operating on the first host;

collect metadata related to the payload;

send the payload and the metadata related to the payload from the application instance to an analytics server application for real time security analysis in response to a determination to analyze the payload based on enforcement of the security policy applied to the first data socket descriptor;

receive feedback from the analytics server application based on the payload and the metadata related to the payload; and process the feedback and apply application and data security policies using an application and data protection layer operating on the first host using the feedback from the analytics server application.

* * * * *